(12) United States Patent
Sze et al.

(10) Patent No.: US 11,849,148 B2
(45) Date of Patent: Dec. 19, 2023

(54) METHOD AND APPARATUS FOR VIDEO ENCODING AND/OR DECODING TO PREVENT START CODE CONFUSION

(71) Applicant: Texas Instruments Incorporated, Dallas, TX (US)

(72) Inventors: Vivienne Sze, Dallas, TX (US); Madhukar Budagavi, Plano, TX (US); Akira Osamoto, Plano, TX (US); Yasutomo Matsuba, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/350,471

(22) Filed: Jun. 17, 2021

(65) Prior Publication Data

US 2021/0314627 A1 Oct. 7, 2021

Related U.S. Application Data

(63) Continuation of application No. 16/263,309, filed on Jan. 31, 2019, now Pat. No. 11,070,844, which is a continuation of application No. 13/529,446, filed on Jun. 21, 2012, now Pat. No. 10,230,989.

(60) Provisional application No. 61/499,276, filed on Jun. 21, 2011, provisional application No. 61/502,387, filed on Jun. 29, 2011.

(51) Int. Cl.
*H04N 19/70* (2014.01)

(52) U.S. Cl.
CPC ................................. *H04N 19/70* (2014.11)

(58) Field of Classification Search
CPC ....................................................... H04N 19/70
See application file for complete search history.

(56) References Cited

U.S. PATENT DOCUMENTS

| 10,230,989 | B2 | 3/2019 | Sze | |
|---|---|---|---|---|
| 2003/0146855 | A1* | 8/2003 | Sullivan | H04N 19/91 341/1 |
| 2004/0030665 | A1* | 2/2004 | Sullivan | H04N 19/89 706/48 |
| 2004/0247033 | A1* | 12/2004 | Cho | H04N 19/61 375/240.26 |
| 2005/0008240 | A1 | 1/2005 | Banerji et al. | |
| 2008/0130735 | A1* | 6/2008 | Meric | H04N 21/8451 375/240 |
| 2012/0155551 | A1* | 6/2012 | Sim | H04N 19/42 375/240.25 |
| 2012/0177107 | A1* | 7/2012 | Fu | H04N 19/61 375/240.03 |

(Continued)

FOREIGN PATENT DOCUMENTS

JP 01081438 A 3/1989

*Primary Examiner* — Leron Beck
*Assistant Examiner* — Shanika M Brumfield
(74) *Attorney, Agent, or Firm* — Carl G. Peterson; Frank D. Cimino

(57) ABSTRACT

A method and a video processor for preventing start code confusion. The method includes aligning bytes of a slice header relating to slice data when the slice header is not byte aligned or inserting differential data at the end of the slice header before the slice data when the slice header is byte aligned, performing emulation prevention byte insertion on the slice header, and combine the slice header and the slice data after performing emulation prevention byte insertion.

20 Claims, 3 Drawing Sheets

(56) References Cited

U.S. PATENT DOCUMENTS

2012/0230428 A1\* 9/2012 Segall .................. H04N 19/70
                                                                375/240.25

\* cited by examiner

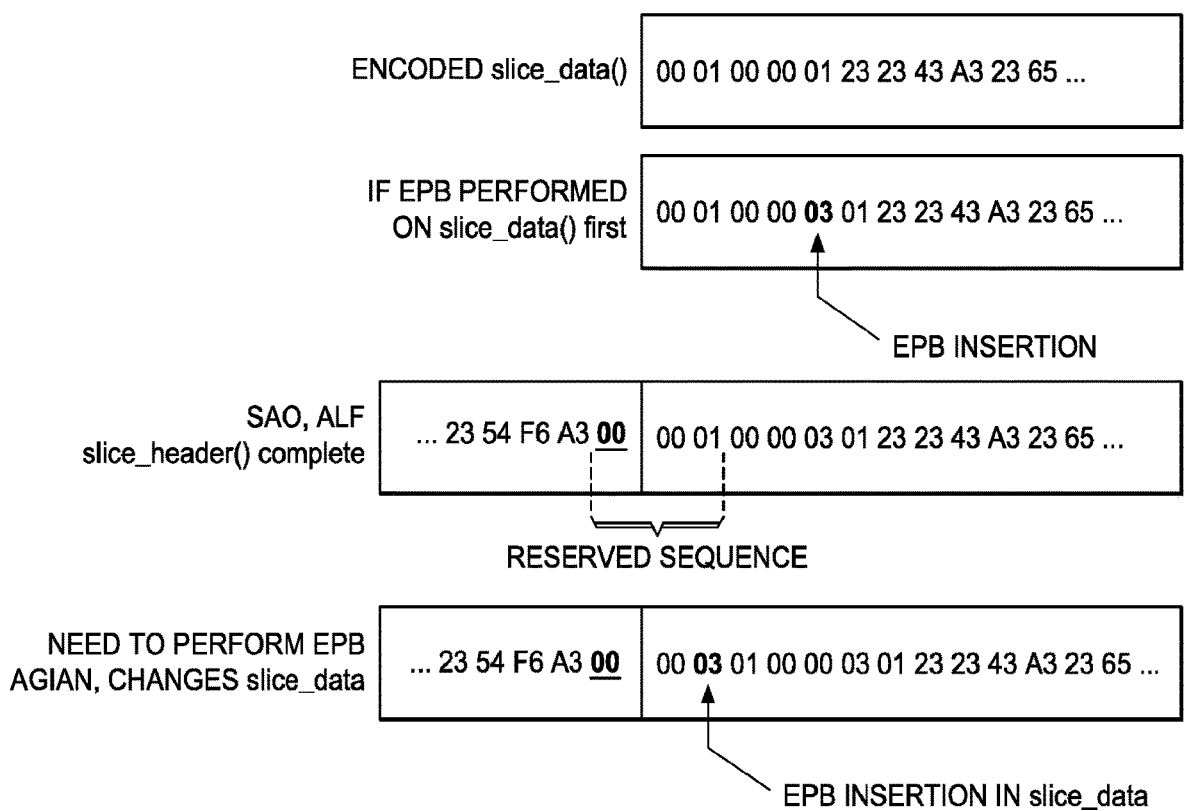

METHOD AND APPARATUS FOR VIDEO ENCODING AND/OR DECODING TO PREVENT START CODE CONFUSION

CROSS-REFERENCE TO RELATED APPLICATIONS

This application is a continuation of U.S. patent application Ser. No. 16/263,309, filed Jan. 31, 2019, which is a continuation of U.S. patent application Ser. No. 13/529,446, filed Jun. 21, 2012 (now U.S. Pat. No. 10,230,989), which claims priority to and incorporates by reference U.S. Provisional Application No. 61/499,276, filed Jun. 21, 2011 and U.S. Provisional Application No. 61/502,387, filed on Jun. 29, 2011. The entireties of the above referenced applications are hereby incorporated herein by reference.

FIELD OF THE INVENTION

This invention generally relates to method and apparatus utilized in an encoder and/or decoder to prevent misidentifying a start code of a video bitstream, for example, when the processing order to generate the syntax elements and the signaling order of the syntax elements within the bitstream are different.

BACKGROUND OF THE INVENTION

FIG. 1 is an embodiment depicting a video processing system. In FIG. 1, a video processing system 100 utilizes an encoder 200 and a decoder 110. The encoder 200 receives video data 120. The encoder 200 encodes in a predetermined format encoded data 130. The decoder 110 receives the encoded data 130 and decodes it according to the predetermined format to produce decoded data 140. The decoder has to properly identify the beginning of each bitstream. The encoder utilizes an identifier to highlight the beginning of the bitstream to the decoder. However, sometimes, the identifier may accidentally exist in the encoded stream where it is not the beginning of the stream.

For example, at the encoder, an existing method of emulation byte prevention (EPB) insertion is used to detect this identifier within the stream and replace it with an alternative pattern. At the decoder, once the beginning of the stream is detected, EPB removal is performed on the rest of the stream. When the syntax elements that are to be encoded into the bitstream is generated in the same order that they are to be signaled in the bitstream, EPB insertion at the encoder may be done on the fly as the bitstream is being generated. This enables low latency encoding, since there is no additional delay of performing EPB insertion. However, when the syntax elements that is to be encoded into the bitstream are not generated in the same order that they area signaled in the bitstream, for instance, when syntax elements generated from step 2 are inserted before syntax elements generated from step 1 in the bitstream. EPB cannot be done of the fly without potentially causing the identifier to appear at the transition point between bits from step 1 and 2.

Therefore, there is a need for an improved method and apparatus that prevents the encoder from misleading the decoder and that assists the decoder to correctly identify beginning of a bitstream

SUMMARY

Embodiment of the current invention relate to a method and a video processor for preventing start code confusion. The method includes aligning bytes of a slice header relating to slice data when the slice header is not byte aligned or inserting differential data at the end of the slice header before the slice data when the slice header is byte aligned, performing emulation prevention byte insertion on the slice header, and combine the slice header and the slice data after performing emulation prevention byte insertion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 is an embodiment depicting Emulation Prevention Byte (EPB) insertion problem.

DETAILED DESCRIPTION OF EMBODIMENTS OF THE INVENTION

Figure 1:
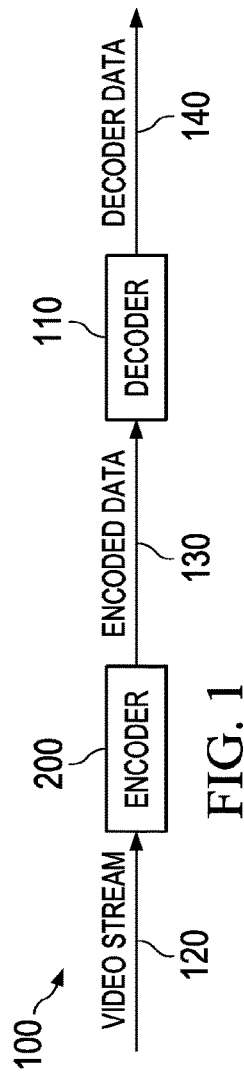
FIG. 1 is an embodiment depicting a video processing system.
Figure 2:
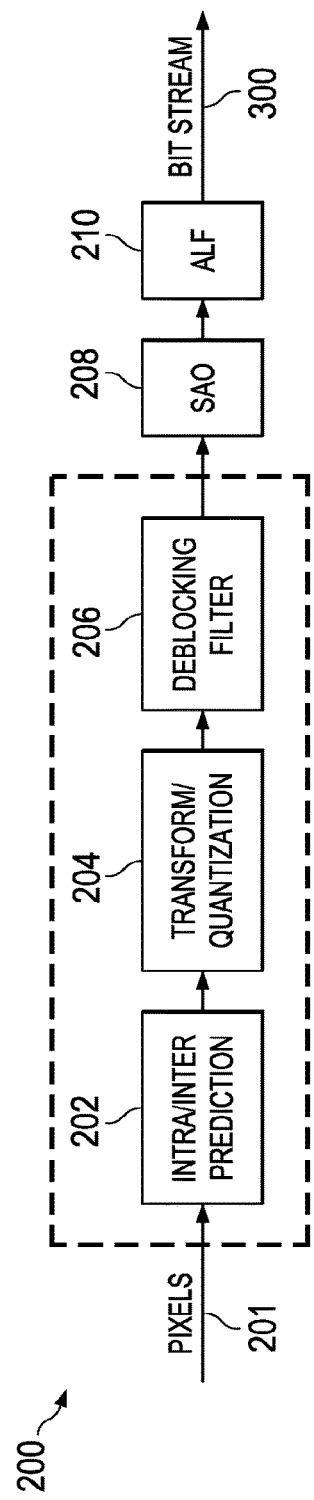
FIG. 2 is an embodiment depicting an encoder.

FIG. 2 is an embodiment depicting an encoder 200. In FIG. 2, the encoder 200 includes an intra/inter prediction module 202, a transform quantization module 204, a deblocking module 206, a Sample Adaptive Offset module (SAO) 208 and an Adaptive Loop Filter (ALF) 210. Video pixels 201 are processed by the encoder 200 to produce a bitstream 300, described in more detail in FIG. 3. Such processing may be block or frame based. The beginning of each slice in a bitstream is highlighted by an identifier, herein called the "start code". The slice header is variable in size and usually precedes the slice data.

Figure 3:
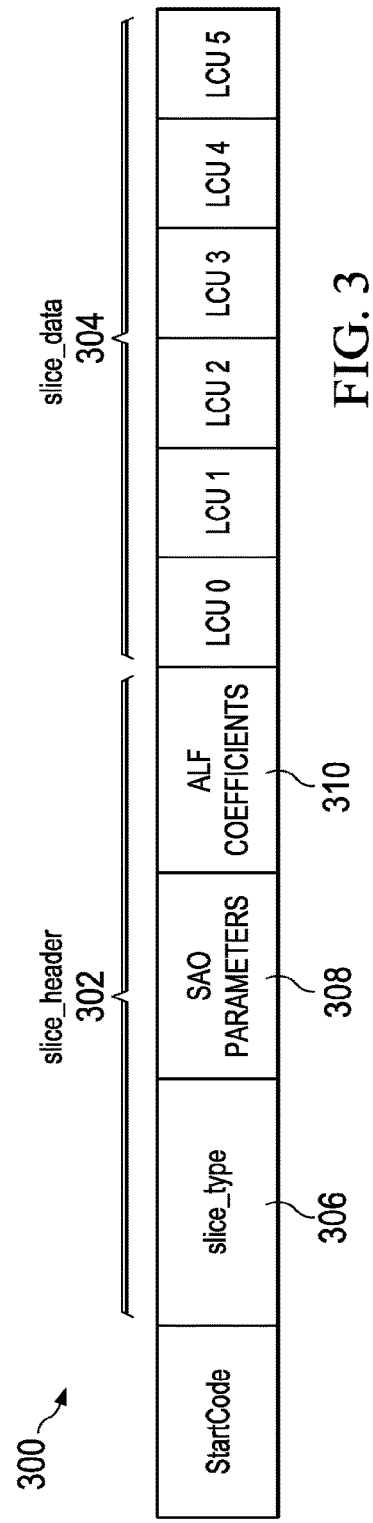
FIG. 3 is an embodiment of a bitstream structure in High Efficiency Video Coding (HEVC) standard.

FIG. 3 is an embodiment of a bitstream 300 structure in High Efficiency Video Coding (HEVC) standard. In FIG. 3, the bitstream 300 includes a slice header 302 and slice data (LCU) 304. The slice header 302 may include slice type 306, SAO parameters 308, and ALF coefficients 310.

For example, the SAO and ALF syntax elements are generated after the slice data syntax elements, but inserted in the slice header which appears before the slice data in the bitstream. Thus, the syntax elements generation and the signaling order are different. The slice header bits are generated after the slice data bits even though it appears before the slice data in the bitstream. EPB insertion may not be applied to slice data until after bits of the slice header are generated, i.e. until after SAO and/or ALF processing is complete to determine the syntax elements to be encoded into the slice header. As a result, there may be an increased delay. Unless the slice header is properly handled, if EPB insertion is done on slice data before slice header is generated, the identifier may appear at the transition between slice header and slice data bits.

It is noted that when EPB insertion is done on slice data 304 to remove the start code, if slice header is added afterwards in front of the slice data, the start code can appear due to the combination of the end of slice header and the start of the slice data. Hence, a start code may incorrectly be detected, where a portion of the start code is at the end of the slice header and the rest of the start code is in the slice data. For example, a portion of the start code may be located at the end of the slice header (e.g. in the ALF coefficient 310) and the rest of the start code may be at the beginning of the slice data. If the start code is '000001', and the slice header ends with '00' and the first LCU starts with '0001', a decoder may mistakenly decode a start code.

Figure 4:
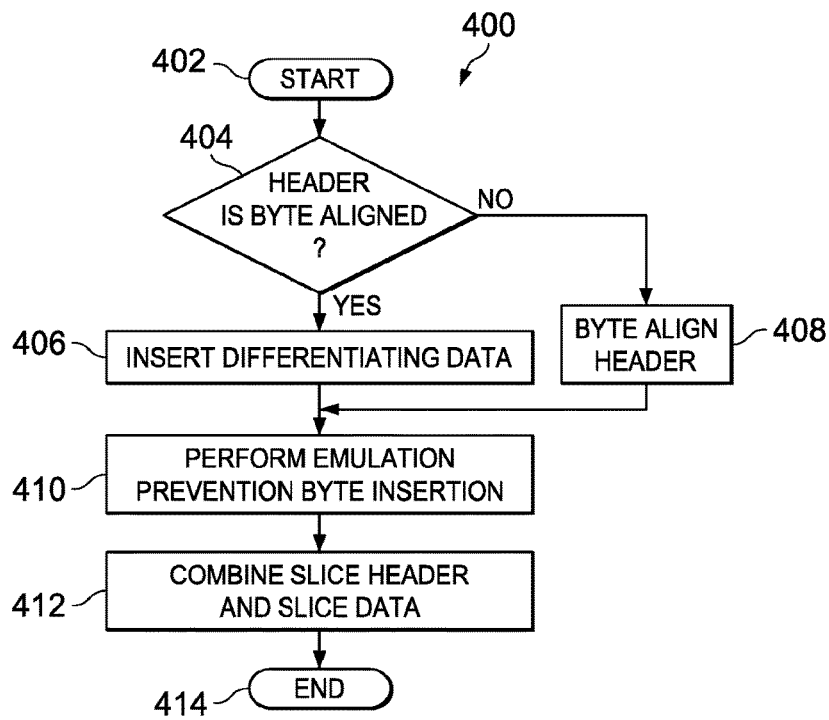
FIG. 4 is an embodiment of a flow diagram for a method for preventing start code confusion.

FIG. 4 is an embodiment of a flow diagram for a method 400 for preventing start code confusion when parameters in the slice header are generated after the slice data. The method 400 starts at step 402 and proceeds to step 404. At step 404, the method 400 determines if the slice header is byte aligned, i.e. if the header is in 8 bits multiples. If it is not aligned, the method 400 proceeds to step 408 wherein the method 400 byte aligns the slice header. In one embodiment, the method 400 utilizes Raw Byte Sequence Payload (RBSP) byte alignment to perform the byte alignment. In one embodiment, the header byte alignment is accomplish by inserting 1's at the end of the slice header. If the slice header is byte aligned, i.e. the header is in 8 bits multiples, the method 400 proceeds to step 406. At step 406, the method 400 inserts differentiating data at the end of the slice header, i.e. ones or binary 'FF'. The method 400 proceeds to step 410 from steps 406 and 408.

At step 410, the method 400 performs Emulation Prevention Byte Insertion on the slice header. In one embodiment, the emulation prevention byte insertion is performed on the header in parallel, simultaneously, with performing the emulation prevention byte insertion on the slice data. In another embodiment, the emulation prevention byte insertion is performed on the header after p4erforming emulation prevention byte insertion on the slice data. At step 412, the method 400 combines the slice header and the slice data. In one embodiment, the slice header and the slice data are combined after the Emulation Prevention Byte Insertion is performed. The method 400 ends at step 414.

By byte aligning the slice header or inserting differentiating data at the end of the slice header, EPB can be done independently on the slice header and the slice data (i.e. EPB insertion in slice header does not affect slice data. Accordingly, on the fly EPB insertion can be performed on slice data before slice header is generated. Once combined, the start code will not appear at their transition point, which reduces the delay of the encoder.

In the case where the start code is '000001' and the slice header is variable in size, the method 400 byte aligns the slice header, i.e., If there is no byte alignment and the last bits of the slice header are x00, alignment is done by using RBSP or insertion of ones or by inserting differentiating data, such as 'FF'. Alternatively, FF can always be inserted at the end of the slice header. The method 400 performs EPB insertion to ensure that the start code was not accidentally created in the header where a start is not intended. In the case that EPB insertion has already been performed on the slice data, EPB insertion may only be performed on the slice header or a portion thereof.

Figure 5:
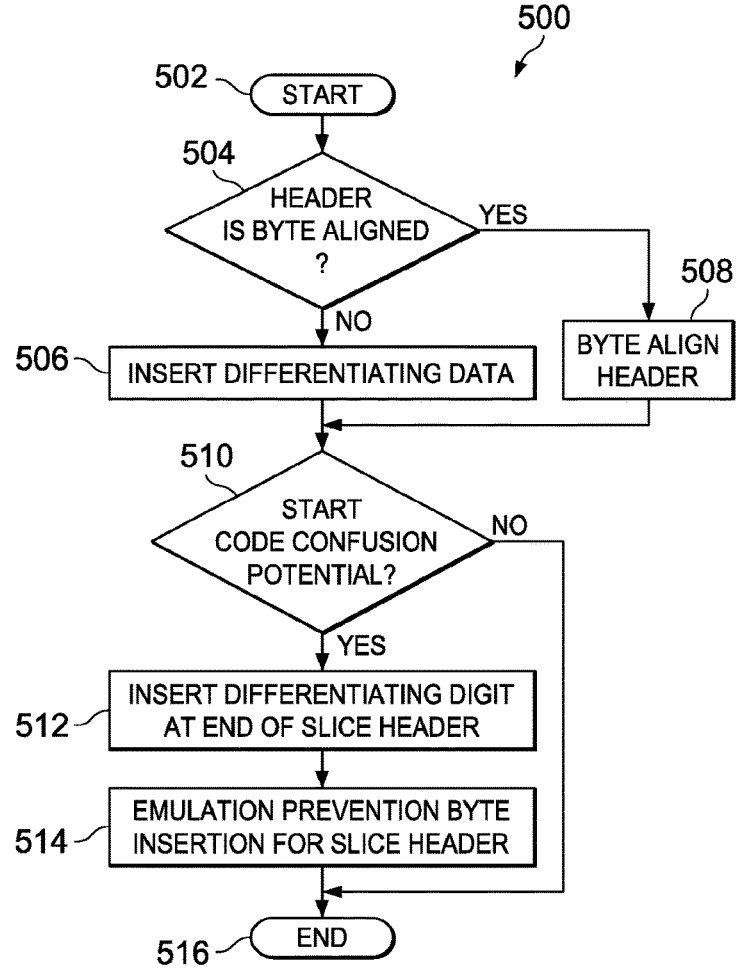
FIG. 5 is another embodiment of a flow diagram for a method for preventing start code confusion.

FIG. 5 is another embodiment of a flow diagram for a method 500 for preventing start code confusion. The method 500 starts at step 502 and proceeds to step 504. At step 504, the method 500 determines if the slice header is byte aligned, i.e. if the header is in 8 bits multiples. If slice header is not aligned, the method 500 proceeds to step 508 wherein the method 500 byte aligns the slice header. In one embodiment, the method 500 utilizes Raw Byte Sequence Payload (RBSP) byte alignment to byte align the slice header. In another embodiment, the header byte alignment is accomplished by inserting 1's at the end of the slice header. If the slice header is byte aligned, i.e. the header is in 8 bits multiples, the method 500 proceeds to step 506. At step 506, the method 500 inserts differentiating data at the end of the slice header, i.e. the differentiating data may be ones or a binary 'FF'. The method 500 proceeds to step 510 from steps 506 and 508.

At step 510, the method 500 determines if there is a potential for code confusion. If there exists start code confusion (i.e., the slice header ends with zeros), the method 500 proceeds to step 512, wherein inserts differentiating data at the end of the slice header, i.e., ones or a binary 'FF'. At step 514, the method 500 performs EPB insertion on the slice header and the method 500 proceeds to step 516. In one embodiment, the emulation prevention byte insertion is performed on the header in parallel, simultaneously, with performing the emulation prevention byte insertion on the slice data. In another embodiment, the emulation prevention byte insertion is performed on the header after performing emulation prevention byte insertion on the slice data. If there is no potential start code confusion, the method 500 proceeds to step 516. The method 500 ends at step 516.

FIG. 6 is an embodiment depicting Emulation Prevention Byte (EPB) insertion problem. EPB, for example 0x03, may be inserted into the bitstream (i.e. RBSP data) after entropy coding to ensure that for consecutive byte-aligned bits, there are no repetitions of any special/reserved codes, i.e. start code prefix '0x000001'. In H.264/AVC EPB is defined as: '00000000 00000000 000000xx' (where xx represents any 2 bit pattern: 00, 01, 10, or 11), and a byte equal to 0x03 is inserted to replace these bit patterns with the patterns: '00000000 00000000 00000011 000000xx'."

The EPB insertion may be done immediately after entropy coding of slice data. However, inserting the SAO parameters and ALF coefficients in the slice header may affect EPB insertion on the slice data bits, for example, slice header may not be byte aligned. In such a case, to prevent change in byte alignment, it is preferred that EPB is not done for slice dataIn one embodiment, EPB insertion is performed on the entire bitstream after SAO and ALF processes have completed. This further increases the delay which is not suitable for low delay applications such as video conferencing. In addition, in CABAC, when entropy coding is performed on SAO parameters and ALF coefficients, the entire sequence may not be fully entropy coded (i.e. compress binary symbols (bins) to bits) until the SAO parameters and ALF coefficients are determined.

In such embodiments, EPB may not be performed on the slice data simultaneously as the SAO and/or the ALF processes are taking place. Once complete, EPB may be performed on the bistream after the SAO and/or ALF are completed. To enable EPB to be performed on the slice data simultaneously, as the SAO and/or the ALF processes are taking place, the slice header is byte aligned.

In one embodiment, the byte alignment is done with ones. If no byte alignment is needed, but the slice header ends with x00, an additional xFF may be inserted. For simplicity, rather than checking the last byte of the slice header, xFF may always be inserted when byte alignment is not needed. In another embodiment, RBSP byte alignment may be utilized, where a stop bit of value 1 is always inserted and the rest of the byte alignment bits can be zero. The slice header and slice data can be stitched together once the slice header is processing is complete. As a result, EPB insertion (or removal at decoder) may be done independently/decoupled from the entropy coding. Such an approach may be implemented to any syntax elements related to processing that occurs at the end of the encoding process, for example, after slice data syntax elements are generated and where the syntax elements generated at the end of the encoding process are inserted before the slice data.

In one embodiment, EPB insertion is performed on slice data before or in parallel with ALF and SAO. When ALF and SAO are completed, EPB insertion is performed up until the end of the slice header, i.e. for the last allowable EPB insertion, the three-byte pattern it replaces, x0000xx, may include bits from the slice header. At the decoder, EPB removal is performed until slice header is reached, i.e. the last allowable EPB removal, the three-byte pattern, x000003, may include bits from the slice header. Thus, in one embodiment, EPB insertion/removal may require knowledge of the slice header/slice data boundary and/or the location where ALF coefficients end.

In another embodiment, the SAO parameters and/or ALF coefficients are placed in a separate NALU. These NALU can be transmitted together in a slice or separately, i.e. the NALU of the slice data can be transmitted first for low latency applications. Such an approach may be implemented to any syntax elements related to processing that occurs at the end of the encoding process, after slice data syntax elements are generated, and where the syntax elements generated at the end of the encoding process are inserted before the slice data.

In one embodiment, CABAC termination and byte alignment of the slice header are only performed when a syntax element related to end of encoding process is inserted in the slice header.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving an encoded bitstream representing a slice, the slice comprising a slice header and slice data;
   removing an emulation prevention byte from the encoded bitstream, wherein a first portion of the emulation prevention byte occurs in the slice header, and wherein a second portion of the emulation prevention byte occurs in the slice data;
   extracting slice-header information from the slice header for the slice in the encoded bitstream, the slice-header information comprising sample adaptive offset information;
   after extracting the slice-header information from the slice header for the slice, performing byte alignment at an end of the slice header; and
   after performing byte alignment at the end of the slice header, extracting slice-data information from the slice data for the slice from the encoded bitstream.

2. The method of claim 1, wherein performing byte alignment comprises extracting a stop bit from the encoded bitstream.

3. The method of claim 2, wherein the stop bit represents a binary value of one.

4. The method of claim 3, wherein performing byte alignment further comprises extracting at least one byte alignment bit from the encoded bitstream after extracting the stop bit from the encoded bitstream.

5. The method of claim 4, wherein the at least one byte alignment bit represents a binary value of, zero.

6. The method of claim 1, further comprising performing a second byte alignment at an end of the slice data after extracting data in the slice data for the slice.

7. The method of claim 1, wherein the first portion of the emulation prevention byte occurs at an end of the slice header.

8. The method of claim 1, wherein the first portion of the emulation prevention byte includes a final two bytes of the slice header.

9. The method of claim 1, wherein the second portion of the emulation prevention byte occurs at a beginning of the slice data.

10. The method of claim 1, wherein the second portion of the emulation prevention byte includes an initial four bytes of the slice data.

11. A system comprising:
    a receiver configured to receive an encoded bitstream representing a slice, the slice comprising a slice header and slice data;
    a decoder coupled to the receiver and configured to:
      remove an emulation prevention byte from the encoded bitstream, wherein a first portion of the emulation prevention byte occurs in the slice header, and wherein a second portion of the emulation prevention byte occurs in the slice data;
      extract slice-header information from the slice header for the slice in the encoded bitstream, the slice-header information comprising sample adaptive offset information;
      after extracting the slice-header information from the slice header for the slice, perform byte alignment at an end of the slice header; and
      after performing byte alignment at the end of the slice header, extract slice-data information from the slice data for the slice from the encoded bitstream.

12. The system of claim 11, wherein performing byte alignment comprises extracting a stop bit from the encoded bitstream.

13. The system of claim 12 wherein the stop bit represents a binary value of one.

14. The system of claim 13, wherein performing byte alignment further comprises extracting at least one byte alignment bit from the encoded bitstream after extracting the stop bit from the encoded bitstream.

15. The system of claim 14, wherein the at least one byte alignment bit represents a binary value of zero.

16. The system of claim 11, further comprising performing a second byte alignment at an end of the slice data after extracting data in the slice data for the slice.

17. The system of claim 11, wherein the first portion of the emulation prevention byte occurs at an end of the slice header.

18. The system of claim 11, wherein the first portion of the emulation prevention byte includes a final two bytes of the slice header.

19. The system of claim 11, wherein the second portion of the emulation prevention byte occurs at a beginning of the slice data.

20. The system of claim 11, wherein the second portion of the emulation prevention byte includes an initial four bytes of the slice data.

* * * * *